UNITED STATES PATENT OFFICE.

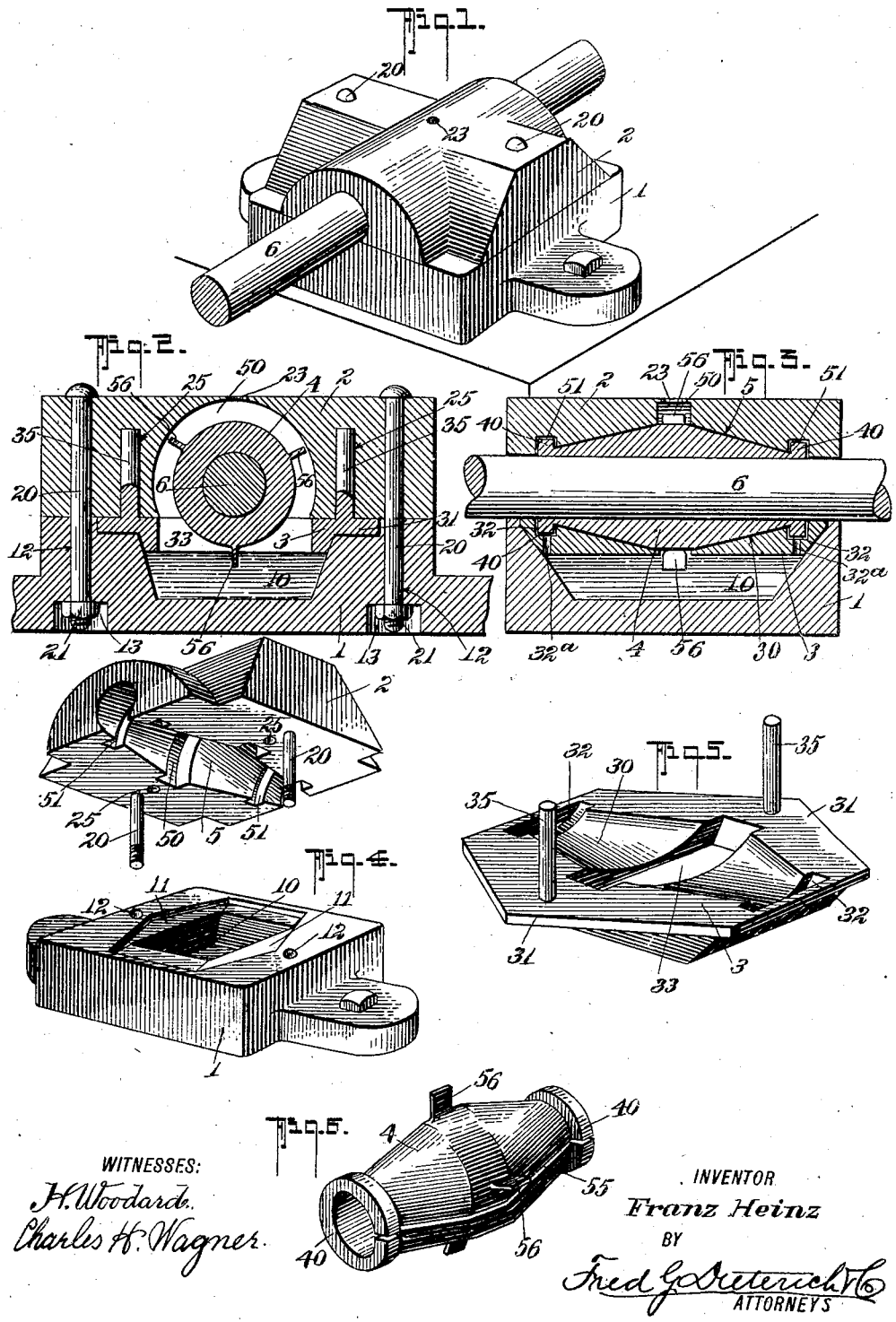

FRANZ HEINZ, OF ATCHISON, KANSAS.

OIL-CUP AND AXLE-BEARING.

No. 923,652.   Specification of Letters Patent.   Patented June 1, 1909.

Application filed August 7, 1908. Serial No. 447,434.

*To all whom it may concern:*

Be it known that I, FRANZ HEINZ, residing at Atchison, in the county of Atchison and State of Kansas, have invented a new and Improved Oil-Cup and Axle-Bearing, of which the following is a specification.

This invention relates to improvements in that class of journal bearings that have an oil chamber in which the journal wholly or partly runs and in which means are provided for carrying the oil over the journal and for returning the surplus lubricant back to the oil chamber.

My invention has for its object to provide a journal box or bearing of the character stated, of a simple and economical construction, and in which the several parts can be conveniently and quickly assembled, and the said invention consists of the peculiar combination, construction and arrangement of parts as hereinafter fully described, specifically pointed out in the claim and illustrated in the accompanying drawings, in which:—

Figure 1, is a perspective view of my invention. Fig. 2, is a vertical, longitudinal section thereof. Fig. 3 is a cross section of the same, taken at right angles on Fig. 2. Fig. 4, is a perspective view of the top and bottom portions of the box separated. Fig. 5, is a similar view of the removable bottom plate. Fig. 6, is a similar view of the wing carrying split sleeve hereinafter referred to.

In the practical application of my invention, the journal box or bearing comprises a base or bottom plate 1, having a dished or hollowed compartment 10 that forms the lubricant holding chamber and the said compartment at the upper end on the opposite sides, is formed with lateral shallow extensions 11—11 preferably shaped in plan view, the purpose of which will presently appear.

Coöperating with the base portion 1 is a top or cap member 2 that has a pair of oppositely disposed stud bolts 20, cast or otherwise fixedly attached thereto, for passing down through apertures 12—12 in the base 1, the lower ends of the said bolts being threaded to receive the clamp nuts 21 that lie flush with the bottom of the base 1 within the seats 13 in the base, as clearly shown in Fig. 2.

The top or cap piece 2 has a semi-spherical groove 5 of suitable shape for receiving a sleeve 4 presently again referred to, the said groove in the drawing being shown widest at the center and of like tapering end portions.

The wide or central portion of the groove merges with a transverse groove 50 that forms the main feed channel for leading the lubricant into the box, a pouring aperture 23 in the cap or top piece communicating with the said groove 50, as clearly shown in Fig. 3.

At the opposite ends the groove 5 has other transverse grooves 51—51 that communicate therewith for receiving the annular flanges 40 on the sleeve 4, and they serve to hold the sleeve from endwise movement within the top or cap member.

The sleeve 4 before referred to has the shape of groove 5 and it is of such a diameter that its lower portion extends in a plane below the bottom of the member 2, and the said lower portion rides in the dished or grooved portion 30 of a supplemental bottom plate 3 that is removably held over and forms a closure or cap for the oil chamber 10, the said plate 3 having its opposite sides extended to form Λ shaped rims 31 for resting in the seats or extensions 11—11 of the chamber 10 and the bottom of the said plate is at a point below the rims 31 so as to pendently extend into the oil or lubricant chamber 10, as shown.

At the opposite ends the plate 3 has grooves 32 to receive the end flanges of the sleeve 4 and the said grooves each has one or more apertures $32^a$ so the surplus oil can drop back into the chamber 10 and midway the plate 3 has a transverse opening 33, through which the bottom of the sleeve projects so it can run freely in the lubricant.

Plate 3 also has stud pieces 35—35 at the opposed sides that extend up into sockets 25—25 in the top plate, said bolts serving to firmly hold the plate 3 in place.

Sleeve 5 is made of spring metal and is split lengthwise as at 55 so it may be readily sprung onto the journal or shaft 6 and the said sleeve also has one or more radially projected scoops or wings 56 that pass down into the oil and lift it up against the groove or bearing surfaces of the top or cap member 2 so as to thoroughly distribute the oil over the entire bearing surface of the sleeve and the journal box.

From the foregoing, taken in connection with the accompanying drawings the complete arrangement and the advantages of my invention will be readily apparent.

It will be observed that as the shaft with the sleeve revolves in the bearing box, a complete circulation of the lubricant is maintained between the oil chamber and the bearings with practically no waste, and as the sleeve is sprung on the shaft and has end flanges for riding in the grooves of the cap plate endwise play of the shaft in the box is reduced to the minimum.

Having thus described my invention, what I claim and desire to secure by Letters Patent, is:—

The combination with the axle and the sleeve clamped thereon, the said sleeve having annular flanges at the ends, and scoops or wings midway the said ends; of a bearing box comprising a bottom plate having an oil cup, a removable cover for the oil cup that forms a bottom bearing for the sleeve and having end grooves for receiving the end flanges of the sleeve, said cover plate also having a slot midway thereof opening into the oil cup and through which the wings of the sleeve travel, a cap plate grooved on its under side to receive the sleeve and having end grooves to receive the flanged ends of the sleeve, and means for securing the cap plate and the bottom plate together.

FRANZ HEINZ.

Witnesses:
BERTHA LEONARDI,
D. S. HOOPER.